United States Patent [19]

Flint

[11] Patent Number: 4,993,609

[45] Date of Patent: Feb. 19, 1991

[54] WHEEL ENCLOSURE

[75] Inventor: Ronald T. Flint, Irvine, Calif.

[73] Assignee: B/T Western Corporation, Newport Beach, Calif.

[21] Appl. No.: 303,839

[22] Filed: Jan. 30, 1989

[51] Int. Cl.5 ............................................. B62D 43/02
[52] U.S. Cl. .................................. 224/42.2; 296/37.3; 224/42.24; 224/42.12
[58] Field of Search ................. 224/42.03 R, 42.06 R, 224/42.12, 42.13, 42.21, 42.24, 42.3, 42.19, 42.18, 42.14, 328, 42.20; 206/304, 303; 220/4 B, 4 F, 4 R; 280/160; 296/37.2, 37.3; 211/23

[56] References Cited

U.S. PATENT DOCUMENTS

| | | | |
|---|---|---|---|
| 1,244,417 | 10/1917 | Brosman | 296/37.3 |
| 1,658,696 | 2/1928 | Walrath | 206/304 |
| 1,917,157 | 7/1933 | Ricci | 206/304 |
| 1,991,327 | 2/1935 | Lyon | 296/37.3 |
| 2,117,049 | 5/1938 | Widman et al. | 296/37.2 |
| 2,189,407 | 2/1940 | Rueppel | 224/42.2 |
| 3,593,898 | 7/1971 | DiForte | 224/328 |
| 4,728,017 | 3/1988 | Mullican | 224/328 |

FOREIGN PATENT DOCUMENTS 434510 9/1935 United Kingdom ............... 224/42.2

Primary Examiner—Henry J. Recla
Assistant Examiner—Glenn T. Barrett
Attorney, Agent, or Firm—Poms, Smith, Lande & Rose

[57] ABSTRACT

An enclosure for encapsulating a wheel, where the wheel includes a tire and wheel rim. The enclosure has a cylindrical shape with a cylindrical side wall and circular end closures whose inner diameter and inner height are greater than the size of the wheel, thus forming a cavity within which the wheel may be placed. The enclosure is separated into two parts on the cylindrical side wall along an elliptical parting line, including: front and rear container halves. The elliptical parting line of the rear container half forms a mounting shelf in the lowermost cylindrical side wall upon which the wheel may rest, and also forms a wheel accessible opening in the upper-most cylindrical side wall for easy removal of the wheel.

17 Claims, 3 Drawing Sheets

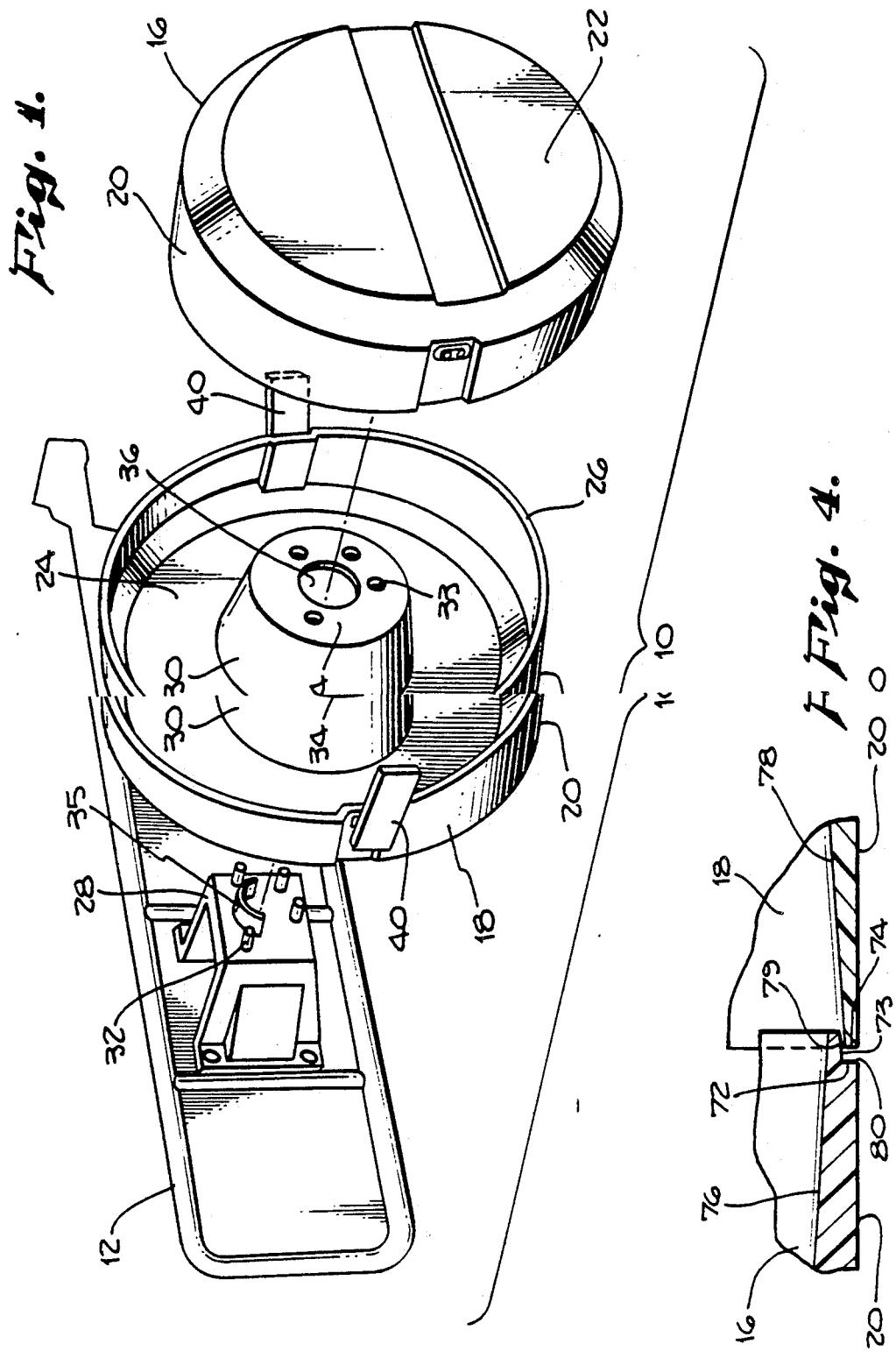

WHEEL ENCLOSURE

BACKGROUND OF THE INVENTION

The present invention relates to a wheel enclosure and, more particularly, to a molded wheel cover for a spare tire.

There are many types of wheel enclosures. The most common is the enclosure in the trunk of an automobile, where part of the trunk has been shaped to the contour of the wheel and is recessed below the level of the rest of the trunk in which the wheel is placed. A wheel enclosure more in line with the subject of the invention herein, is the external wheel enclosure which mounts typically on the exterior of a motor vehicle. The motor vehicle being either a car, truck or recreational vehicle. Typically, a wheel enclosure of the sort contemplated in the invention, can be found on vehicles such as a four-wheel drive recreation vehicle, where the wheel, tire and wheel rim, are mounted to a bracket on the exterior of the vehicle. The wheel is then typically covered with a canvas or plastic shroud to protect the wheel from the environment. Unfortunately, these type of shrouds tend to wear and tear and do not adequately protect the wheel from the elements. There have been attempts to design more weather-impervious covers, but these designs have inherent difficulty with the removal and insertion of the wheel. The invention herein obviates the above disadvantages of the canvas or plastic shroud and other prior art containers.

SUMMARY OF THE INVENTION

The invention may be summarized as a vehicle wheel enclosure for encapsulating a wheel completely in a container so that the wheel is impervious to the harsh environment to which the vehicle is exposed. The enclosure provides for easy insertion and removal of the wheel therefrom. The enclosure which encapsulates the wheel is a two-part construction with a cylindrical shape having a cylindrical side wall and circular end closures whose inner diameter and height are greater than the wheel. The two-piece enclosure is separated into front and rear container halves along an elliptical parting line in the cylindrical side wall. The elliptical parting of the container enables the rear container half to have a mounting shelf on the lower cylindrical side wall on which the tire may be rested and secured through the rear container half to the motor vehicle. The elliptical parting in the upper cylindrical side wall forms an accessible opening which enables the easy removal of the wheel from the rear container half. The front container half then interfits with the rear container half to form the enclosure. The two halves are typically joined together as one enclosure by means of a latching mechanism which holds the two halves securely together. The front and rear container halves have tapered interfitting edges for ensuring the proper joining of the halves into an enclosure.

BRIEF DESCRIPTION OF THE DRAWINGS

FIG. 1 is an exploded view of the wheel enclosure of present invention in combination with a motor vehicle mounting bracket;

FIG. 4 is a detailed side view in cross-section of the tapered edges of the two halves which form the wheel enclosure;

DETAILED DESCRIPTION OF THE PREFERRED EMBODIMENT

Figure 3:
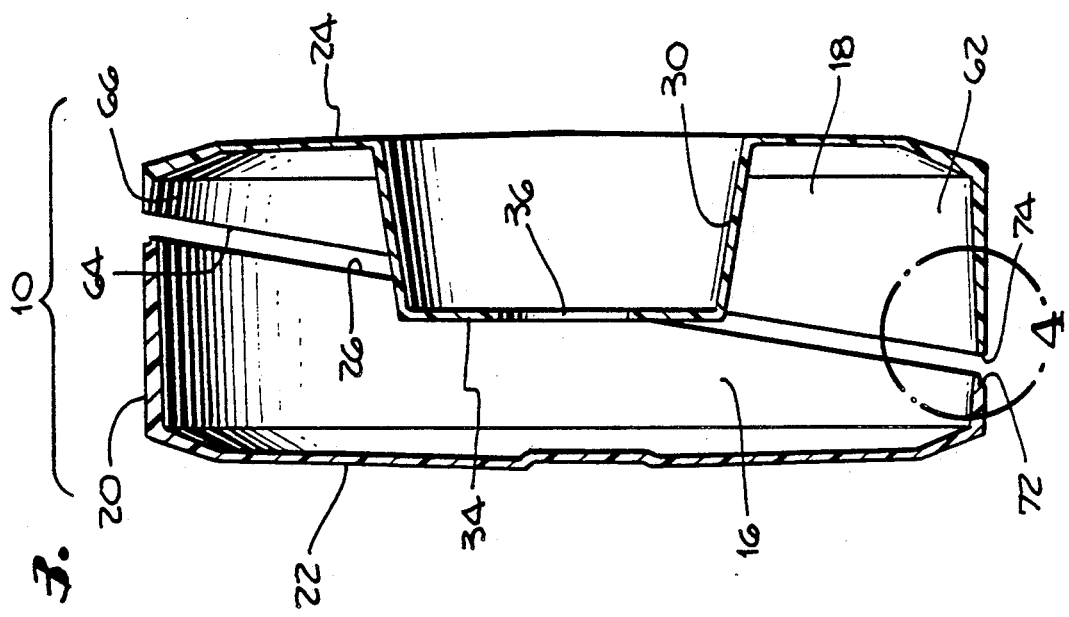
FIG. 3 shows a side view of the wheel enclosure in cross-section.

Referring now to FIG. 1, the preferred embodiment of a wheel enclosure 10, according to the present invention, is shown in an exploded view in combination with a motor vehicle mounting bracket 12 that is representative of a typical type of mounting bracket which would be utilized in combination with the present invention. The wheel enclosure 10 has two halves, a front container half 16 and a rear container half 18. The front and rear halves 16 and 18 of the enclosure 10 are formed from a cylindrical side wall 20 having circular end closures 22 and 24 which have been separated along the cylindrical side wall 20 by an elliptical parting line 26.

The rear container half 18 joins with the motor vehicle bracket 12 by means of rectangular mounting bracket 28 Rectangular mounting bracket 28 is configured to enable it to fit inside a frustum cone section 30 formed in the circular end closure 24 (FIG. 3). A plurality of bolts 32 mounted within rectangular bracket 28 securely holds the rear container half 18 to the bracket 28 through bolt holes 33 in a flat surface 34 of container half 18 formed by frustum cone section 30. When container half 18 is securely fastened to rectangular bracket 28, a saddle-bracket 35 passes through an aperture 36 in the flat surface 34 of rear container half 18 for use in securely holding a wheel (not shown) by the mounting bolts 32.

While not shown, alternative mounting methods to secure the rear half 18 to a motor vehicle would include the use of speed nuts with the above-noted bracket, securing the rear half 18 to the bracket. The lug bolts which secure the wheel to a vehicle mounting bracket would also secure the rear half 18 to the vehicle mounting bracket independently. Also, rear half 18 can be mounted by use of press-on clips which would secure rear half 18 to a bracket on a motor vehicle.

Additionally, utilizing a similar bracket as shown in FIG. 1, but with a central circular opening, there would be a one-point mounting method, wherein a separate carriage bolt passes through the center circular opening and secures the back half 18 with the use of a washer, lock nut, and back plate bracket, holding the bolt and extending vertically beyond the upper and lower circumference of the circular opening, thus enabling a rear securing bracket to hold the carriage bolt and secure the rear half 18 to the bracket. A variation on the one-point system could include a circular carrier plate positioned between the bracket and the exterior back mounting surface of rear half 18. The carrier plate would have the lugs incorporated therein and pass into the rear half 18. The carrier plate, as well as the rear half, would be secured to the vehicle mounting bracket by a single carriage bolt which centrally secures said carrier plate and said rear half 18

Wheel enclosure 10 forms a cavity in which the wheel is encapsulated by the joining of front container half 16 to rear container half 18. Joining is accomplished by a pair of latch mechanisms 40, where latch arms 42 on rear container half 18 join with latch keepers 43 on a front container half 16 to securely hold the two halves together to form wheel enclosure 10.

Figure 2:
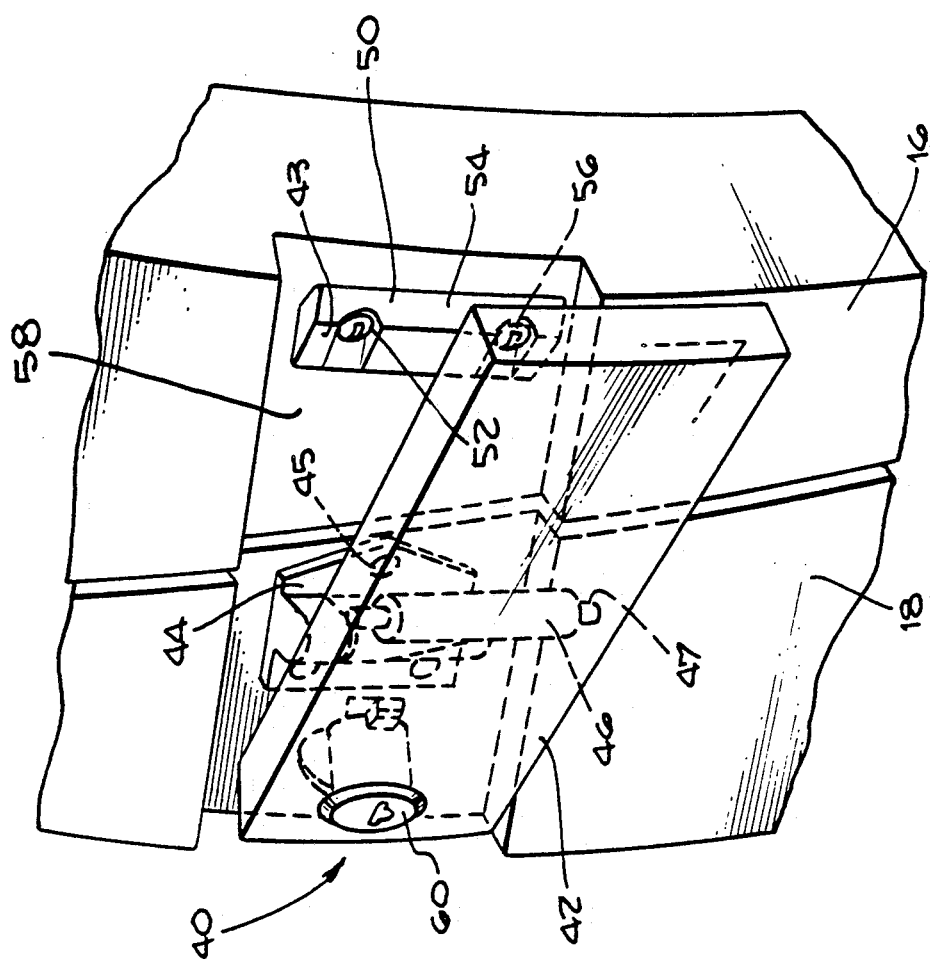
FIG. 2 is a partial view, shown in perspective, of a latch mechanism utilized in joining the wheel enclosure.

FIG. 2 shows a detailed view of latch 40. Latch cover or arm 42 is typically made of ABS plastic. The latch 40 has a base 44 joined to rear container half 18 by means of bolts 45. Hinged arm 46 connects to cover 42 by means of a pin 47 which fits into latch cover 42. Keeper 43 is mounted to front container half 16 by means of bolts 52. Keeper 43 is angled along edge 54 sufficiently to engage with edge 56 in cover 42, to ensure intimate contact of cover 42 with a recessed surface 58 in front container half 16 and rear container half 18 when the latch 40 is closed in order to join the two halves to form wheel enclosure 10. As shown in FIG. 2, the latch 40 could have a lock cylinder 60 which enables one to lock each latch 40 utilized to join the two container halves 16 and 18 for improved security.

FIG. 3 shows a side view of enclosure 10 as it is parted along the elliptical parting line 26 in cylindrical side wall 20 which results in front and rear container halves 16 and 18. The elliptical parting line 26 Q forms a shelf section 62 in the lower part of rear container half 18. The shelf section 62 allows the wheel to rest on the shelf while the wheel is attached to the rear container halve 18 and mounting bracket 28. The elliptical parting line 26 also allows easy withdrawal of the wheel from rear container half 18 because in the upper half of rear container 18 there is a wheel accessible opening 64 in a reduced width section 66 of the cylindrical side wall 20. The accessible opening 64 allows easy insertion and removal of the wheel from rear container half 18.

Front container half 16 joins with rear container half 18 at interfacing edges 72 and 74, respectively. The interface edges of the two halves are tapered with edge 72 having an offset 73, which permits the interfitting of edge 74 securely therein to form enclosure 10.

FIG. 4 shows a detailed cross-sectional view of the edges 72 and 74 on the enclosure halves 16 and 18. Edge 72 has the offset 73 to receive and flushly join with edge 74. Each half 16 and 18 has interior surface 76 and 78, respectively, tapered as shown, with corresponding exterior surface having a taper of less than one-half degree. The interior taper 79 on offset 73 is sufficient to enable that taper to slidably join with tapered surface 78 on container half 18 to permit the necessary intimating contact. A lower edge surface 80 in offset 73 prevents the two halves from being joined too far along their tapered surfaces that they could not be separated. The tapers 76, 78 and the offset 73 ensure a smooth cylindrical side wall 20.

The two container halves 16 and 18 can be joined together with other means besides latches 40 indicated herein. The two halves could be hinged on one bottom or hinged on the side with a lock on the opposite side to securely hold the two halves together. There could also be a series of pins and clips around two to three points on the circumference of the cylindrical side wall which joins the two halves to form the wheel enclosure 10. Additionally, the wheel enclosure itself may be joined to a vehicle using the motor vehicle bracket shown at 12 with a rectangular mounting bracket 28 or a bracket on the vehicle body or inside the vehicle.

The elliptical parting line 26 in the two halves 16 and 18 is a key attribute of the wheel enclosure 10. The elliptical parting of the enclosure enables the wheel to be placed on the shelf 62 for mounting to rear container half 18.

The angle formed in the rear container half 18 by parting line 26 has to be of a sufficient degree to form a support for the wheel and to form a sufficient opening to ensure the easy insertion and removal of the wheel. Therefore, the elliptical parting line has to have an angle sufficient to ensure the configuration described herein.

Figure 5:
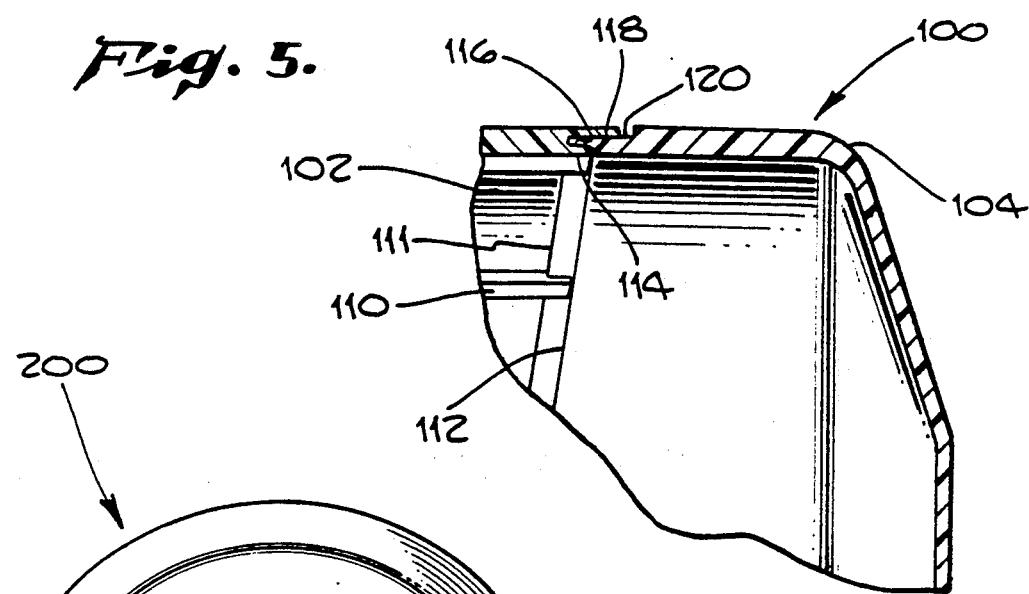
FIG. 5 is a partially cross-section view of the wheel enclosure showing an alternative embodiment of the invention.

FIG. 5 illustrates an alternative joining and alignment arrangement for a wheel enclosure 100, including front and rear halves 102 and 104, respectively. The front half 102 has a plurality of ribs 110, only two of which are shown, which interact with a stop edge 112 on rear half 104. The ribs 110 can be incorporated to improve the structural strength of the front half 102 of the wheel enclosure. Each rib 110 is provided with an extending tab 114 which is separated from the cylindrical outer surface of front cover 102 by a spacing or recess 116. The mating edge of rear half 104 is relieved on its inner surface by stop edge 112 and on its outer surface by a second relief 118. When the mating edge of rear half 104 is received in recess 116, the rib 110 abuts against stop edge 112 to fix a gap 120 between the front half 102 and the recess 118 of approximately 0.10 inches.

Figure 6:
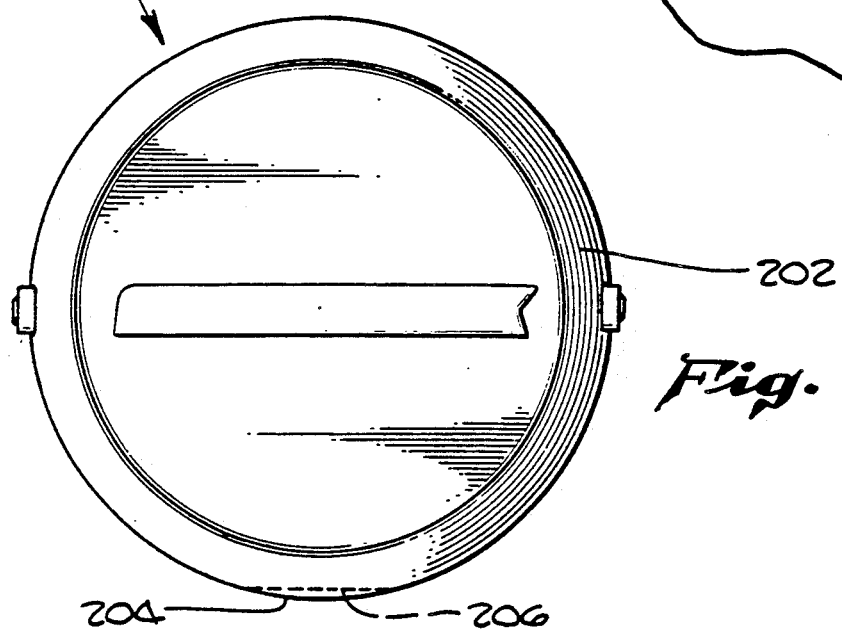
FIG. 6 is a front view of the wheel enclosure illustrating a drain.

FIG. 6 illustrates a front view of another alternative enclosure 200 with a section 206 in the form of a chord removed from the rear half 204 at the bottom thereof to allow the drainage of rain water and moisture. The drain 206 is not visible when front half 202 is joined with rear half 204 to form enclosure 200. The drain 206 should allow moisture to be removed from the enclosure 200 and prevent the growth of mildew by aeration. The size of the chord opening 206 is sufficient to enable drainage and aeration without affecting the structural integrity of the rear half 204.

Figure 7:
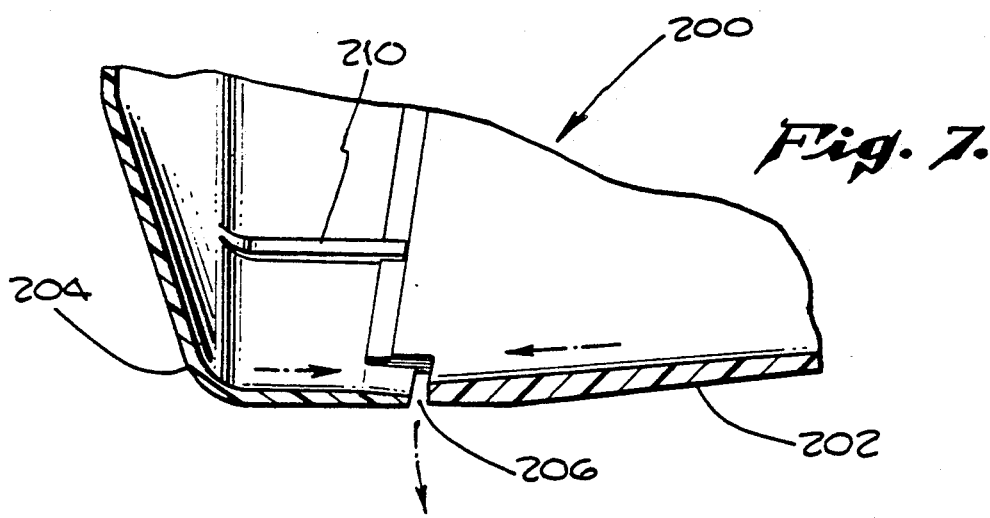
FIG. 7 is a partial view in cross-section showing the drain illustrated in FIG. 6.

FIG. 7 illustrates a side view in cross-section of the bottom of enclosure 200 which incorporates ribs 210 and stop 212 similar to those illustrated in FIG. 5. The drain 206 is shown in this view to illustrate that it is not visible in a front view.

The enclosure 10 can be constructed from plastic or composites or light weight metal alloys of aluminum or magnesium. Such construction will provide for structural stability without compromising the desire for a light weight, durable enclosure.

Having thus described the preferred embodiments of the present invention, it should be noted by those skilled in the art that the embodiments are exemplary only of various alternatives, adaptions and modifications that may be made within the scope of the present invention. Thus, the present invention is limited only by the following claims.

I claim:

1. An enclosure for encapsulating a wheel, wherein said wheel includes a tire and wheel rim, comprising:
said enclosure having a cylindrical shape with a straight, cylindrical side wall and circular end closures whose inner diameter and inner height are greater than said wheel to form a cavity within which said wheel may be placed;
said enclosure separated inn said cylindrical side wall along a planar, elliptical parting line to form front, and rear container halves;
said elliptical parting line in said rear container half forming a mounting shelf in a lowermost cylindrical side wall upon which said wheel may rest and a wheel accessible opening in an uppermost cylindrical side wall for easy removal of said wheel; and means for mounting said rear container half to orient said rear container half for ensuring that said wheel rests upon the lowermost cylindrical side wall.

2. An enclosure, as claimed in claim 1, wherein:

said front and rear container halves have tapered edges within said cylindrical side wall at said parting line to ensure an interfitting of said halves to form said enclosure;

means for the draining of moisture from said enclosure; and means for securely holding said halves together to form a single enclosure.

3. An enclosure, as claimed in claim 2, wherein said means for securely holding comprise:

a latch mechanism mounted upon one of said container halves for joining said first mentioned container half to the other container half.

4. An enclosure, as claimed in claim 3, wherein: said latch mechanism for joining said front and rear container halves utilizes two latch arms on opposite sides of said rear container half and two keepers on opposite sides of said front container half.

5. An enclosure as claimed in claim 2, wherein said means for draining moisture from said enclosure comprises said rear container half having an opening shaped as an arcuate wedged section in said lowermost cylindrical side wall of said rear container half which ensures drainage of said moisture.

6. An enclosure, as claimed in claim 1, additionally comprising;

means for securing said wheel to said rear container half of said enclosure including a frustum cone constructed in the center of said circular end closure of said rear container half; and said frustum cone having apertures therein which may be aligned with similar apertures in said wheel for securing said wheel thereto.

7. An enclosure, as claimed in claim 6, wherein said means for securing said wheel to said frustum cone comprise:

said cone having a series of slots arranged in a circular pattern therein which enables the alignment of lug holes within said wheel rim with said slots to further enable fasteners to pass there through to fasten said wheel rim to said back half of said frustum cone.

8. An enclosure, as claimed in claim 6, additionally comprising:

a semi-cylindrical member passing through said frustum cone to engage and support said wheel rim.

9. An enclosure, as claimed in claim 1, wherein said means for mounting said enclosure to said vehicle include mounting bolts which securably hold said rear container half of said enclosure to said vehicle.

10. An enclosure for encapsulating a wheel, wherein said wheel includes a tire and wheel rim, comprising:

said enclosure having a cylindrical shape with a straight, cylindrical side wall and circular end closures whose inner diameter and inner height are greater than said wheel to form a cavity in which said wheel may be placed;

said enclosures separated in said cylindrical side wall along a planar, elliptical parting line to form front and rear container halves;

said container halves being constructed or lightweight molded plastic;

said elliptical parting line in said rear container half forming a mounting shelf within the lowermost cylindrical side wall upon which said wheel may rest and forming a wheel accessible opening within the uppermost cylindrical side wall for easy removal of said wheel; and mounting means for securably mounting said rear container half of said enclosure and orienting said enclosure wherein said wheel rests upon said lowermost cylindrical side wall.

11. An enclosure, as claimed in claim 10, wherein:

said front and rear container halves have tapered edges within said cylindrical side wall at said parting line to ensure an interfitting of said halves to form said enclosure;

a drain in said enclosure formed by the removal of a sufficient bottom section of said rear container half; and means for securely holding said halves together to form a single enclosure.

12. An enclosure, as claimed in claim 11, wherein said means for securely holding comprise:

a latch mechanism mounted upon one of said container halves for joining said first mentioned container half to the other container half.

13. An enclosure, as claimed in claim 12, wherein:

said latch mechanism for joining said front and rear container halves utilizes two latch arms on opposite sides of said rear container half and two keepers on opposite sides of said front container half.

14. An enclosure, as claimed in claim 10, additionally comprising:

means for securing said wheel to said rear container half of said enclosure including a frustum cone constructed in the center of said circular end enclosure of said rear container half; and said frustum cone having apertures therein which may be aligned with similar apertures in said wheels for securing said wheel thereto.

15. An enclosure, as claimed in claim 14, wherein:

the means for securing said wheel to said frustum cone comprise a series of slots arranged in a circular pattern in said cone which enable the alignment of lug holes within said wheel rim with said slots to further enable fasteners to pass through to fasten said wheel rim to said back half of said frustum cone.

16. An enclosure, as claimed in claim 15, additionally comprising:

a semi-cylindrical member passing through said frustum cone to engage and support said wheel rim.

17. An enclosure for encapsulating a wheel, wherein said wheel includes a tire and wheel rim, comprising:

said enclosure having a cylindrical shape with a straight, cylindrical side wall and circular end closures whose inner diameter and height are greater than said wheel to form a cavity within which said wheel may be placed;

said enclosure separated in said side wall along a planar, elliptical parting line to form front and rear container halves;

said elliptical parting line in said rear container half forming a mounting shelf in the lower most cylindrical side wall upon which said wheel may rest and a wheel accessible opening in the uppermost cylindrical side wall for easy removal of said wheel;

said front and rear container halves have tapered edges within said cylindrical wall at said parting line to ensure an interfitting of said halves to form said enclosure;

said halves securely held together by a latching mechanism which utilizes two latch arms on opposite sides of one of said container halves and two keepers on opposite sides of the other container half;

said rear container half of said enclosure includes a frustum constructed in the center of said circular end closure thereof;

said lower most cylindrical side wall having a section removed from draining moisture from said enclosure;

said wheel adapted to be secured to said frustum cone through a series of apertures in said cone which enable the alignment of said wheel;

said enclosure adapted to be mounted by use of said cone; and said apertures in said frustum cone oriented to ensure said wheel rests upon said lowermost cylindrical side wall.

* * * * *